Dec. 20, 1960  L. L. WOLMAN  2,965,828
SERVO DAMPING MECHANISM
Filed July 24, 1958  4 Sheets-Sheet 1

INVENTOR.
LANE L. WOLMAN
BY
ATTORNEY

FIG. 4

Dec. 20, 1960  L. L. WOLMAN  2,965,828
SERVO DAMPING MECHANISM
Filed July 24, 1958  4 Sheets-Sheet 3

Dec. 20, 1960   L. L. WOLMAN   2,965,828
SERVO DAMPING MECHANISM
Filed July 24, 1958   4 Sheets-Sheet 4

United States Patent Office 2,965,828
Patented Dec. 20, 1960

2,965,828

SERVO DAMPING MECHANISM

Lane L. Wolman, North Hollywood, Calif., assignor to General Precision, Inc., a corporation of Delaware Filed July 24, 1958, Ser. No. 750,802

23 Claims. (Cl. 318—448)

This invention relates to new and improved circuitry for damping servo mechanisms and more particularly to new and improved means for the reduction or elimination of dynamic errors in velocity damped servo mechanisms.

Servo mechanisms, in general, are designed to maintain an input and an output member in correspondence. Any difference of position between said input and output members is detected by a transducer which provides, as its output, an electrical signal proportional to said difference of position. This output signal is amplified and used to control a motor such that the motor drives the output member toward realignment with the input member. Because of the inertia of the mechanical system, the output member will tend to overshoot the position of correspondence, and may also exhibit other signs of instability. The many methods which have been used to control this instability are called "damping" or "stabilization."

One commonly employed technique utilizes a rate generator or tachometer which provides a signal proportional to the velocity of the output member. This signal is suitable for damping a servo mechanism. At constant velocity of the output member the rate generator supplies a signal of constant amplitude which, when introduced back into the amplifier, opposes the signal introduced by the input member to cause the driven output member to lag behind the input member to produce a dynamic error. In many servo mechanisms, such an error is extremely undesirable.

In the following discussion, the rate generator or tachometer is assumed to be an A.C. instrument. In such an instrument, the rate generator is excited by an A.C. signal of a fixed frequency. Rotation of the rate generator shaft causes a change in the amplitude of the A.C. carrier or exciting frequency proportional to the speed of rotation of the rate generator shaft.

Briefly described, this invention provides means for controlling the lag or error in a servo loop employing A.C. rate generator damping by providing electrical circuitry for modifying the effective frequency response of the rate generator at a pre-selected range of frequencies.

An object of the present invention is the provision of means for the elimination or reduction of dynamic lags in velocity damped servo loops.

Still another object is the provision of means for altering the rate generator frequency response to yield desired damping characteristics.

A further object is the provision of means for the cancellation of the low frequency components of the rate generator frequency response.

A still further object is the provision of means for increasing the D.C. and low frequency gain of the velocity damped servo loop.

The exact nature of this invention, as well as other objects and advantages thereof, will be readily apparent from consideration of the following specification relating to the annexed drawings in which.

Figure 1:
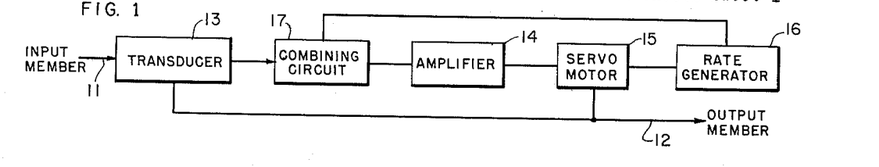
Figure 1 shows a schematic diagram of a conventional servo loop employing rate generator damping.

Turning now to a more detailed description of the drawings, there is shown in Figure 1, a schematic diagram of a conventional servo loop employing rate generator damping. As is the purpose of all servo loops, it is desired to maintain correspondence between an input member 11 and an output member 12. A transducer 13 detects any difference in position between the input and output members and supplies an error signal to an amplifier 14. The amplified error signal coming from the amplifier 14 is used to control a servo motor 15 which drives the output member 12 toward correspondence with the input member 11. A rate-responsive generator or tachometer 16, mounted on the output member 12 such that the shaft of the tachometer 16 is turned at the same rate as the output member 12, supplies a signal proportional to the rate of change of position of the output member 12. This proportional signal is combined with the error signal by a combining circuit 17, and serves to damp the servo loop.

In the following discussion it should be understood that reference to the response frequencies of the rate generator does not mean the excitation or carrier frequency of the rate generator, but rather denotes the frequency of modulation of said carrier frequency. These modulation frequencies result from changes in the speed of rotation of the shaft of the rate generator. Thus when the shaft of the rate generator is turning at constant speed, the amplitude of the output frequency (carrier frequency) of the rate generator will not change and we will have a zero or D.C. modulation frequency. Accordingly, when changes in the speed of the rate generator shaft occur, changes in the amplitude of the carrier frequency result. These changes are the modulation frequencies hereinbefore referred to.

A careful consideration of the behavior of a conventional servo loop reveals that when the rate of change of the output member is relatively large, that is when the rate generator output contains high modulation frequencies, the need for damping is most acute. On the other hand, when the rate of change of the output member is a minimum (constant speed of rotation of the output member), that is, the output of the rate generator contains its lowest modulation frequencies, damping is least necessary. Thus, a system such as embodied in this invention which provides maximum signal from the rate generator at higher rate generator modulation frequencies and minimum or zero signal from the rate generator at low or zero. (D.C.) modulation frequencies from the rate generator yields optimum damping when necessary.

Let us now examine the cause of the undesired lags in the servo loop resulting from the use of rate generator damping. The rate generator provides a signal proportional to the speed of rotation of its input shaft. This signal is introduced to the servo amplifier 180 degrees out of phase with the error signal. Thus when the error signal is large relative to the rate generator signal, the rate generator signal causes only a small effect on the rotation of the servomotor. However, when the error signal is small relative to the rate generator signal, the rate generator signal has a large effect on the rotation of the servomotor and tends to oppose the motion of the output member. Since the error signal will be large when the input and output members are relatively far from correspondence, the rate generator signal does not interfere with the tendency of the error signal to cause the servomotor to drive the output member toward correspondence with the input member. However, when the output and input members are near a position of correspondence, the error signal is relatively small. Nevertheless, the inertia of the mechanical system still tends to drive the output member past the position of correspondence or causes it to overshoot. However, the rate generator signal, in opposition to the inertia rotation of the output member, is now relatively large and tends to oppose the before mentioned overshoot. This results in effective damping action.

Let us consider a conventional servo loop in which the input member is rotating at constant speed. In such a condition the output member will also rotate at constant speed. Yet, the presence of the rate generator signal needed for damping results in a lag of the output member behind the input member. This lag is often very undesirable. Reconsidering the system taught by this invention, which provides maximum signal from the rate generator at higher rate generator modulation frequencies and minimum signal from the rate generator at low or D.C. modulation frequencies of the rate generator, it is evident that the system also provides optimum damping when necessary. From the foregoing, it is also clear that such a system also yields error or lag free response. My invention provides means for re-shaping the modulation frequency response of the rate generator in accordance with the principles stated above.

Figure 2:
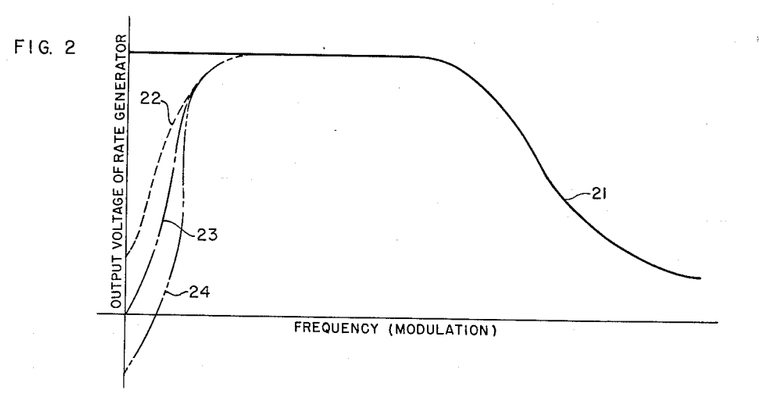
Figure 2 shows the normal response curve compared with the response curves of a rate generator produced by circuitry embodying this invention.

In Figure 2 the normal response curve 21 of a rate generator is shown. The curves shown in Figure 2 are plotted such that the output voltage of the rate generator appears on the vertical axis and the modulation frequency appears on the horizontal axis. The output voltage of the rate generator as shown represents the maximum voltage output from the rate generator at a particular rotational speed of the rate generator input shaft. Thus, at zero modulation frequency, we have a constant speed of the input shaft equal to the before mentioned particular speed. At higher modulation frequencies, the output voltage of the rate generator represents the maximum voltage output from the rate generator and corresponds to the maximum speed of rotation of the rate generator input shaft which is made equal to the particular speed mentioned above. Curve 21 shows a dropping off in voltage response at the higher modulation frequencies. This dropping off is due to the electrical characteristics of a rate genreator.

The voltage output from the rate generator at zero and low frequencies is undesirable and represents a velocity lag in the servo loop. Response curve 22 represents a rate generator characteristic in which the velocity lag has been reduced, at and near constant speeds of the input shaft of the rate generator. Response curve 23 represents a rate generator characteristic in which the velocity lag has been eliminated at constant speeds of the input shaft of the rate generator and reduced at low modulation frequencies. Response curve 23 is generally optimum for a single servo loop. Response curve 24 represents a rate generator characteristic in which the lag introduced by the tachometer is replaced by lead, at or near constant speeds of the input shaft of the rate generator. This type of response is extremely useful in servo systems when considering multiple loops in which lags occurring within the system cannot be eliminated. The introduction of lead is made to compensate for these unavoidable and undesirable lags. My invention provides means for the achievement of any of the frequency response characteristics 22, 23 and 24 described above.

One method of accomplishing the purposes discussed above and shown by the curves 22, 23 and 24 is by the use of a band-pass filter. However, in an A.C. system, where the frequencies to be filtered are modulations of a carrier frequency, the design of an effective band-pass filter has been extremely difficult in the past.

Figure 3:
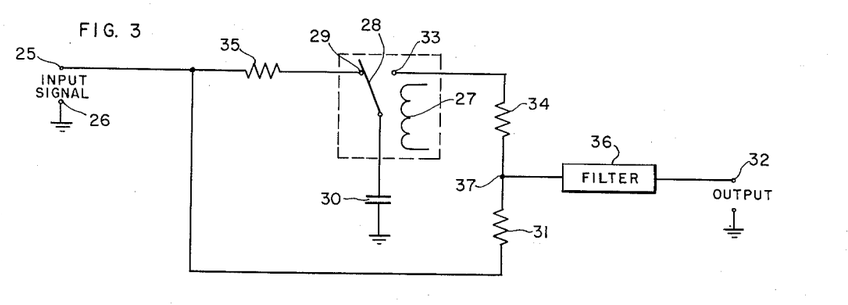
Figure 3 shows one form of an A.C. low-pass filter according to this invention utilized in the embodiment of this invention illustrated in block diagram in Figure 6.

In Figure 3 which shows one embodiment of such an A.C. low-pass filter, an input signal consisting of an A.C. carrier frequency modulated at the signal frequencies is introduced between terminal 25 and terminal 26 (ground). Chopper 27 is operated in synchronization with the carrier frequency. Thus, when chopper arm 28 is in contact with terminal 29 during the positive half cycle of the carrier, the capacitor 30 will be charged by the incoming signal. At the same time, a path through the resistor 31 permits current to flow through the filter 36. Thus, at point 37 we obtain a signal similar to the input signal. However, the amplitude of said signal can be adjusted by changing the resistor 31. During the negative half cycle of input signal, the chopper 27 closes the circuit between the capacitor 30 and the output 32 through the chopper arm 28, terminal 33, resistor 34, and filter 36. Capacitor 30 will discharge through the resistor 34 and at point 37 the signal will be a combination of the signal from capacitor 30 and the input signal from the resistor 31. The maximum amplitude of the signal from capacitor 30 can be adjusted by changing the resistor 34. Thus, resistors 31 and 34 can be adjusted so that the carrier and low modulation frequency components of the input signal are reduced in magnitude as shown in curve 22 of Figure 2; eliminated as shown in curve 23 of Figure 2; or overbalanced such that a lead voltage is obtained as shown in curve 24 of Figure 2. The resistors 34 and 35, in combination with the capacitor 30, control the time constant of the circuit and in so doing set the limits of the pass-band of the modulation-frequency filter. The higher harmonics present in the input signal cannot be compensated for by adjustment of resistors 31 and 34. Therefore, a filter 36 is introduced in the circuit to remove the undesired high frequencies.

Figure 4:
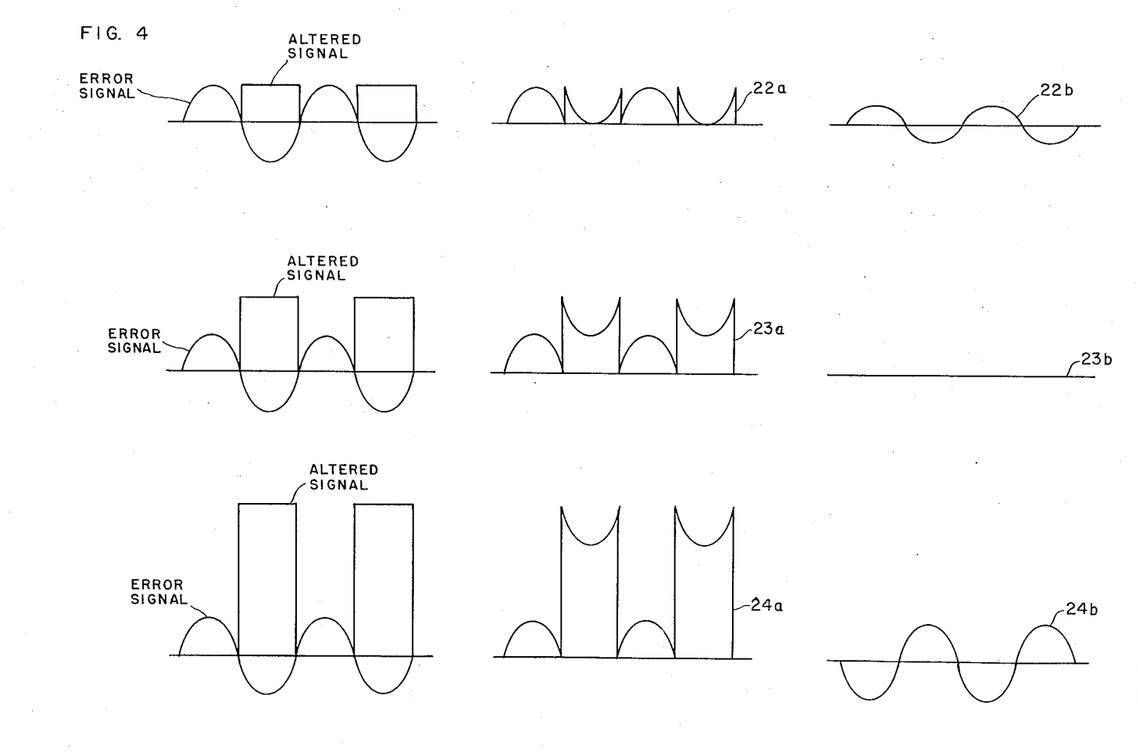
Figure 4 shows the electrical signals read at various points in the circuit of Figure 3.

Figure 4 shows signals which correspond to the results shown in curves 22, 23 and 24 of Figure 2. Curve 22a represents a signal which can be achieved by adjustment of the resistors 31 and 34, and is a combination of the error signal from resistor 31 and the altered error signal from resistor 34. When the signal represented by curve 22a of Figure 4 (taken at point 37) is passed through filter 36, the signal shown in curve 22b (taken at point 32) will result. It should be noted that such a signal represents a decrease in magnitude of the error signal. Curve 23a which can be achieved by adjustment of the resistors 31 and 34 results in signal 23b (taken at point 32) after passing through the filter 36. Here it is seen that no A.C. component remains. Curve 24a represents still another result which can be achieved by the proper adjustments of resistors 31 and 34. After passage through filter 36, signal 24b (taken at point 32) will result. It should be noted that this curve is opposite in phase to the input error signal and hence, represents a lead voltage.

All of the voltages shown in Figure 4 are based upon an error signal of constant magnitude (zero modulation frequency) being introduced to the modulation filter network. It remains to be considered what effect different modulation frequencies have upon the outputs from the modulation filter network. Let us consider an input signal of varying amplitude to the modulation filter network. If the variations in amplitude are slow enough so that the capacitor 30 can be charged to the maximum voltage of the positive half cycle during the time when the chopper arm 28 makes contact with the terminal 29, the voltage variations will be transmitted to the point 37 through the resistor 34. At higher modulation frequencies, however, the capacitor 30 will not be charged to the maximum amplitude of the input signal during the positive half cycle time and will lag behind changes in the maximum amplitude. If the changes are rapid enough, the capacitor 30 will ignore said changes, and hence such changes will be completely ineffective on the signal at point 37. Thus, it is only signals of low modulation frequencies which will be transmitted to point 37 and there serve to cancel the signal coming from the resistor 31. The cancellation effect which yields the results shown in Figure 4 only takes place at zero and low modulation frequencies and does not take place at the higher modulation frequencies. This result can be seen to correspond to the desired characteristics shown in Figure 2.

Figure 5:
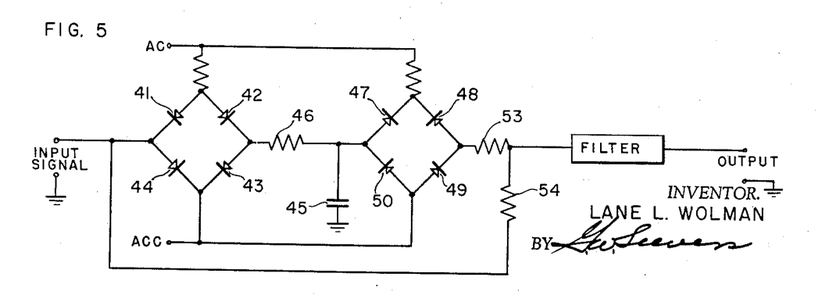
Figure 5 shows another form of A.C. low-pass filter which may also be utilized in the embodiment of this invention shown in Figure 6.

Figure 5 discloses another embodiment of the principle discussed above in which the chopper is replaced by a diode network. The A.C. modulation filter described above can be designed using either an active element such as a chopper or completely passive elements such as crystal diodes. A diode network composed of diodes 41, 42, 43 and 44 receives, as its input, a signal from the tachometer or rate generator. During the half cycle of the A.C. carrier when the voltage on the A.C. line is positive with respect to the voltage on the A.C.C. line, the diodes will conduct and present a low resistance to the tachometer signal. During the half cycle of the A.C. carrier when the A.C. line is negative with respect to the A.C.C. line, the diode network will present a higher resistance to the tachometer signal. When the diode network presents a low resistance to the input tachometer signal, the capacitor 45 will be charged through the resistor 46. Thus, the diode network composed of diodes 41, 42, 43 and 44 functions in exactly the same fashion as the chopper circuit of Figure 3 when the chopper arm 28 makes contact with the terminal 29 allowing the capacitor 30 in Figure 3 to be charged. During the positive half cycle of the A.C. carrier, a second diode bridge circuit composed of diodes 47, 48, 49 and 50 presents a high resistance to the tachometer signal since the diodes composing the second bridge are connected in opposite polarity to the diodes composing the first bridge. Thus, during the positive half cycle of the carrier, the second bridge acts similarly to the chopper circuit of Figure 3 when the chopper arm 28 is not in contact with the terminal 33. During the negative half cycle of the A.C. carrier, the first diode bridge circuit will present a high resistance to input signals from the tachometer, while the second diode bridge circuit will present a low resistance path between the capacitor 45 and the resistor 53. The operation during the negative half cycle and the A.C. carrier is exactly equivalent to the operation of the chopper circuit of Figure 3 when the chopper arm 28 is in contact with the terminal 33. As can be seen from comparison of Figure 3 and Figure 5, adjustment of the relative value of resistors 53 and 54 of Figure 5 can produce the same effect as adjustments of the relative values of the resistors 34 and 31 of Figure 3. However, it should be noted that in the circuit of Figure 5 the A.C. and A.C.C. lines must be isolated with respect to ground.

Figure 6:
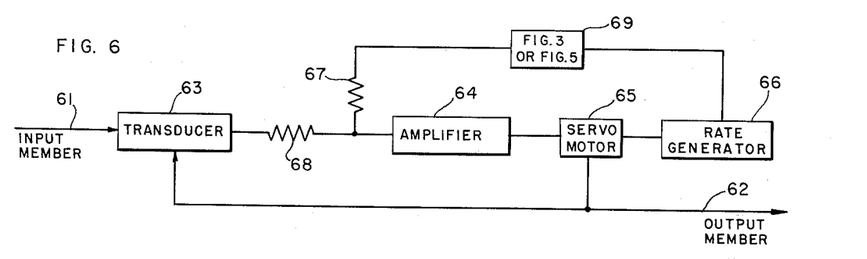
Figure 6 shows in block diagram one form of this invention using the filters shown in Figures 3 and 5.

Figure 6 discloses the application of the filters shown in Figures 3 and 5 to a servo loop as shown in Figure 1. In Figure 6, it is desired to maintain correspondence between an input member 61 and an output member 62. A transducer 63 detects any difference in position between the input and output members and supplies an error signal to an amplifier 64. The amplified error signal coming from the amplifier 64 is used to control a servo motor 65 which drives the output member 62 toward correspondence with the input member 61. A rate generator or tachometer 66, mounted on the output member 62 such that the shaft of the tachometer 66 is turned at the same rate as the output member 62, supplies a signal proportional to the rate of change of position of the output member 62. This proportional signal, which serves to damp the servo loop, is filtered by the action of either the circuit of Figure 3 or Figure 5 (69 in Figure 6) as hereinbefore described, and is then combined with the error signal by combining resistors 67 and 68 (Figure 6). Thus, the input signal to the amplifier 64 is a composite signal made up of the error signal from the transducer 63 and the filtered proportional signal from the rate generator 66. The effect of the filtered rate generator signal has been explained above.

We turn now to a detailed description of the embodiment of this invention shown in Figures 7–11. The filter technique for the reduction or elimination of lags disclosed in Figures 1–6, was based on the cancellation of the tachometer signal at D.C. and low frequencies. The system disclosed in Figures 7–11, however, does not cancel out the undesired portions of the tachometer signal, but rather effectively amplifies the low frequencies of the components of the error signal so that, at these low frequencies, the lag due to the tachometer signal is reduced any desired amount.

Figure 8:
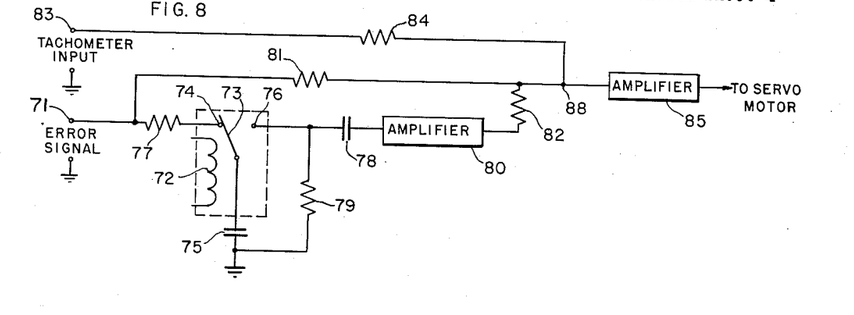
Figure 8 shows one circuit utilized in a second embodiment of this invention.

In the circuit disclosed in Figure 8, the low frequency components of the error signal are actually amplified. However, in the circuits of Figures 9 and 10, effective amplification of the low frequency components is accomplished by an actual attenuation of the high frequency components of the error signal. In either case the effect of the servo loop is the same.

Figure 7:
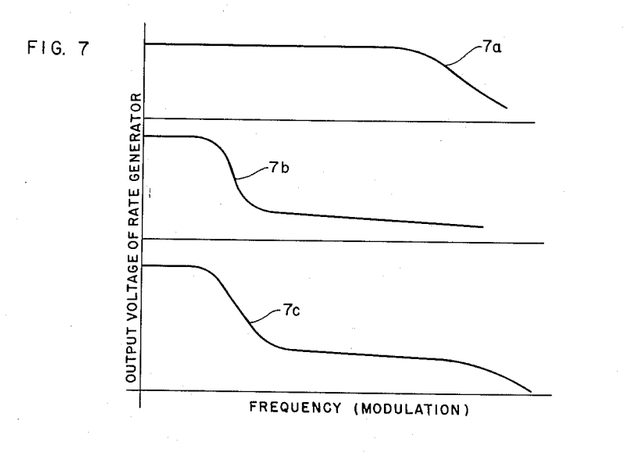
Figure 7 shows the response curve of a rate generator as effectively modified by the form of this invention illustrated in Figures 8, 9 and 10.

Curve 7a shows the normal response of a rate generator. Curve 7b shows the response curve of the error signal with amplified low frequency components. Since the rate generator signal and error signal are combined to form the input to the servo amplifier, curve 7c shows the response curve of the combined signal. The lag due to the rate generator signal at low frequencies is dependent upon the ratio of the error signal to the tachometer signal such that, the larger this ratio can be made, the less lag due to the rate generator signal will be observed. However, the natural frequency of the servo loop occurs at a frequency in the mid-range of the frequencies shown, i.e., above the D.C. and low frequency components. At this frequency, the ratio of error signal to tachometer signal must be its lowest, since values of the ratio higher than a particular value at that frequency, will result in instability of the servo loop. However, at frequencies below the natural frequency of the servo loop, much higher values of the ratio can be utilized without any resulting instability in the loop. Thus, the low frequency components of the error signal have little effect on the stability of the servo loop, and by amplifying the low frequencies, we can reduce any constant error due to the tachometer signal, by an amount proportional to the amplification factor.

In Figure 8 a circuit accomplishing the result set out above is shown. The error signal is introduced between terminal 71 and ground. This error signal passes through a resistor 77 to terminal 74 of chopper 72. Since the chopper is operated in synchronization with the carrier frequency, when a chopper arm 73 is in contact with terminal 74 during the positive half cycle of the carrier, a capacitor 75 will be charged by the incoming error signal. During the negative half cycle of input error signal the chopper 72 makes contact between the capacitor 75 and the terminal 76 through the chopper arm 73. From the terminal 76, the signal passes through capacitor 78 which acts in combination with resistor 79 as input circuit to the amplifier 80. The amplifier 80 contains a conventional phase inverter.

As has been described before, the combination of resistor 77 and capacitor 75 forms a low-pass filter, since rapid changes in the maximum input voltage to the capacitor 75 will not be able to charge capacitor 75 during the positive half cycle time. If the changes are rapid enough, the capacitor 75 will never be able to respond to such changes and hence, such changes will be completely ignored. We have then, at the output of amplifier 80, an effective amplification of the low frequency components of the error signal, since the high frequency components of the error signal have been deleted by the action of resistor 77 and capacitor 75 acting in combination, as a lowpass filter. The amplified low frequencies of the low error signal are combined with the original error signal through resistors 81 and 82. The composite error signal is then combined with the tachometer damping signal introduced to the circuit at terminal 83 through resistor 84 which is used to adjust the tachometer voltage. The combined error signal and the tachometer signal are then combined at point 88 and introduced to the servo amplifier 85. The output of amplifier 85 is introduced to the servo motor.

Figure 9:
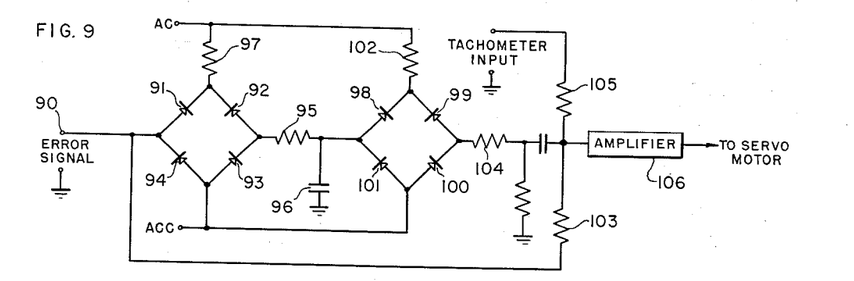
Figure 9 shows a modified circuit which may be used in the second embodiment of this invention.
Figure 10:
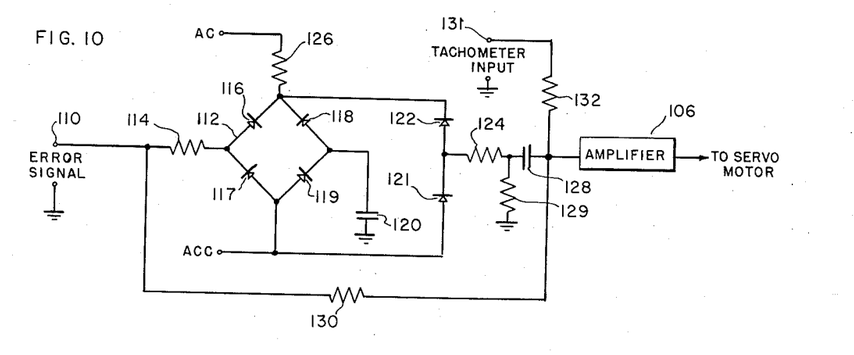
Figure 10 shows a still further modification of the circuit which may be used in the second embodiment of this invention.

Figures 9 and 10 illustrate alternative methods of accomplishing the result desired in the embodiment shown in Figures 8, 9 and 10 without the use of a chopper. In both figures, the chopper is replaced by diode networks which are so arranged that no phase inversion is necessary. Since the altered error signal comes out in phase with the original error signal, the circuit of Figure 9 is similar to the circuit of Figure 5 described above. In Figure 9, the error signal is introduced between terminal 90 and ground to a diode bridge composed of diodes 91, 92, 93 and 94. During the positive half cycle of the error signal, that is, when the voltage on the A.C. line is relatively more positive than the voltage on the A.C.C. line, the diode bridge presents a low resistance to the error signal. During the negative half cycle of the carrier, the diode bridge presents a high resistance to the error voltage. Thus, the diode bridge acts as a switch between the error signal and the low-pass filter composed of resistor 95 and capacitor 96. During the positive half cycle, the capacitor 96 will be charged towards the voltage level of the error signal. However, because of the time constants of resistor 95 and capacitor 96, only voltage changes of low frequency will pass through the filter. Resistor 97 limits the current to the diode bridge. A second diode bridge composed of diodes 98, 99, 100 and 101, also provides a low resistance to the error signal during the positive half cycle of the carrier. It is during the positive half cycle then, that the capacitor 96 is charged and the voltage to the amplifier is sampled. During the negative half cycle of the carrier, that is, when the voltage on the A.C.C. line is relatively more positive than the voltage on the A.C. line, no charging of the capacitor 96 takes place, nor does any voltage transfer to the amplifier. Resistor 102 limits the current to the second diode bridge.

The first diode network composed of diodes 91, 92, 93 and 94 changes the A.C. error signal to a D.C. signal which is stored on capacitor 96. However, capacitor 96 can only respond to slow changes in the maximum value of the A.C. error signal as described before and hence, acts as a low-pass filter passing only the D.C. and low frequency components of the modulation frequencies of the A.C. carrier. The second diode network composed of diodes 98, 99, 100 and 101 reconverts the D.C. signal on the capacitor 96 to an intermittent D.C. signal which is then mixed with the original error signal, amplifying said error signal at low modulation frequencies only. The combination error signal thus formed is mixed with the damping signal and introduced to amplifier 106. Resistors 103, 104 and 105 are used to adjust the relative magnitudes of the error signal, the relatively amplified low frequencies of the error signal, and the tachometer signal, respectively. By adjusting the ratio of these resistors, a reduction in the lag due to the tachometer signal can be achieved.

Turning now to a detailed description of the form of circuitry shown in Figure 10, which is comparable in function to that shown in Figure 9, with the exception that diodes 98 and 101 are removed from the second diode bridge shown in Figure 9 together with other minor modifications. The circuit shown in Figure 10 functions in exactly the same manner as the circuit shown in Figure 9. The error signal is introduced between terminal 110 and ground through resistor 114 to a diode bridge 112 composed of diodes 116, 117, 118 and 119. A capacitor 120 is connected between the junction of diodes 118 and 119 and ground. The junction of diodes 117 and 119 is connected to the A.C.C. line and the junction of diodes 116 and 118 is connected through resistor 126 to the A.C. line. Diodes 121 and 122 are placed in series between the A.C.C. line and the junction of diodes 116 and 118. Resistor 124 is connected between the junction of diodes 121 and 122 and a resistor 129. Resistor 129 has its opposite side connected to ground. The junction of resistors 124 and 129 is connected to capacitor 128. The opposite side of capacitor 128 is connected to resistor 132. The tachometer input is introduced between terminal 131 and ground and is connected to the opposite side of resistor 132. The error signal is introduced to a resistor 130 which has its opposite side connected to the junction of capacitor 128 and resistor 132. The junction of resistor 130, 132 and capacitor 128 is connected to amplifier 106 which is the same as amplifier 106 in Figure 9.

It is to be noted that it is necessary to change the position of resistor 114 in Figure 10 (95 in Figure 9) to the opposite side of bridge 112 since the sampled signal should not pass through this resistor. The operation of the circuit of Figure 10 is identical to that of Figure 9 with the exceptions noted.

Figure 11:
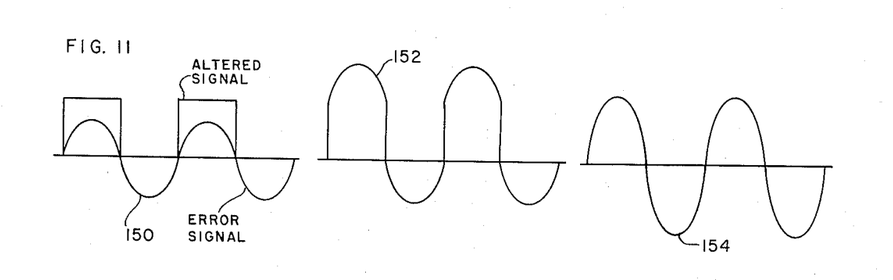
Figure 11 shows the waveforms of the voltages at various points in the circuit of Figure 8.

Figure 11 shows the waveforms of the voltages at point 88 of Figure 8. In curve 150 the error signal is shown combined with the altered error signal. The combination signal is shown in curve 152. After an appropriate filter contained in the servo amplifier, the result shown in curve 154 (taken at point 88) is obtained. Thus, we see that we have an effective amplification of the original error signal as shown in curve 111 with the result shown in curve 154. As has been stated before, this amplification will only take place for low modulation frequencies of the carrier.

I claim:

1. A servomechanism comprising a servo motor, a rate-responsive generator excited at a particular frequency and driven by said motor, a feedback circuit between said generator and said motor to control the operation of the motor and including means in said feedback circuit for inhibiting the passage through said feedback circuit of signals having a relatively low frequency, said means including a chopper excited at said particular frequency, a movable arm on said chopper making a connection to said generator during first alternate half cycles of said particular frequency and making a connection to said motor during the other half cycles of said particular frequency, and a capacitor connected to and charged by said generator through said chopper arm during said first half cycles and connected to and discharging into said motor through said chopper arm during said other half cycles.

2. A servomechanism comprising a servo motor, a rate-responsive generator excited at a particular frequency driven by said motor, a feedback circuit between said generator and said motor to control the operation of the motor and including means in said feedback circuit for inhibiting the passage through said feedback circuit to said motor of signals having a relatively low frequency, said means including a first diode bridge controlled by said particular frequency to present a relatively high resistance during first one-half cycles of said particular frequency and a relatively low resistance during second one-half cycles of said particular frequency, and a second diode bridge controlled by said particular frequency to present a relatively low resistance during first one-half cycles of said particular frequency and a relatively high resistance during second one-half cycles of said particular frequency, and a capacitor connected to and charged by said generator through said first diode bridge during said first one-half cycles and connected to and discharging into said motor through said second diode bridge during said second one-half cycles.

3. A servomechanism comprising an input member movable to different positions, an output member movable to different positions, means including transducing means responsive to said input and output members for producing A.C. electrical signals representing any difference in the positioning of said input and output members, means including damping means responsive to the movements of the output member for producing A.C. electrical signals representing the rate at which the position of the output member is changing at any instant, means including electrical circuitry responsive to said difference signals and said rate signals for increasing the amplitudes of said difference signals relative to the amplitudes of said rate signals at a pre-selected range of frequencies of said signals and for combining said difference and rate signals after such relative increase to produce resultant signals, and a servo motor responsive to said resultant signals for varying the positioning of said output member in the direction which minimizes said resultant signals.

4. Apparatus according to claim 3 in which the means for increasing the amplitudes of said difference signals relative to the amplitudes of said rate signals at a pre-selected range of frequencies comprises electrical circuitry which selectively amplifies said difference signals.

5. Apparatus according to claim 4 in which the electrical circuitry which selectively amplifies said difference signals is only responsive to relatively low frequencies of said difference signals.

6. A servomechanism including an input member movable to different positions, an output member movable to different positions, means including transducing means responsive to said input and output members for producing A.C. electrical signals having a particular frequency and having an amplitude envelope representing any difference in the positioning of said input and output members, means including damping means responsive to the movements of the output member for producing A.C. electrical signals having said particular frequency and having an amplitude envelope representing the rate at which the position of the output member is changing at any instant, means including electrical circuitry responsive to said difference signals and said rate signals for increasing the amplitudes of said difference signals relative to the amplitudes of said rate signals in a pre-selected range of frequencies of said signals and for combining said difference signals and rate signals after such relative increase to produce resultant signals, said means comprising an amplifier, a chopper excited at said particular frequency, said chopper having a movable arm making a connection to said difference signals producing means during first alternate one-half cycles of said particular frequency and making a connection to said amplifier during the other alternate one-half cycles of said particular frequency, and a capacitor connected to and charged by said difference signals producing means through said chopper arm during said first one-half cycles and connected to and discharging into said amplifier through said chopper arm at said alternate one-half cycles, and a servomotor responsive to said resultant signals for varying the positioning of said output member in the direction which minimizes said resultant signals.

7. A servomechanism including an input member movable to different positions, an output member movable to different positions, means including transducing means responsive to said input and output members for producing A.C. electrical signals having a particular frequency and having an amplitude envelope representing any difference in the positioning of said input and output members, means including damping means responsive to the movements of the output member for producing A.C. electrical signals having said particular frequency and having an amplitude envelope representing the rate at which the position of the output member is changing at any instant, means including electrical circuitry responsive to said difference signals and said rate signals for increasing the amplitudes of said difference signals relative to the amplitudes of said rate signals in a pre-selected range of frequencies of said signals and for combining said difference signals and rate signals after such relative increase to produce resultant signals, said means comprising an amplifier, a first diode bridge controlled by said particular frequency to present a relatively high resistance during first one-half cycles of said particular frequency and a relatively low resistance during alternate one-half cycles of said particular frequency, and a second diode bridge controlled by said particlar frequency to present a relatively high resistance during first one-half cycles of said particular frequency and a relatively low resistance during alternate one-half cycles of said particular frequency, and a capacitor connected to and charged by said difference signals producing means through said first diode bridge and connected to and discharging into said amplifier through said second diode bridge, and a servomotor responsive to said resultant signals for varying the positioning of said output member in the direction which minimizes said resultant signals.

8. A servomechanism including an input member movable to different positions, an output member movable to different positions, means including transducing means responsive to said input and output members for producing A.C. electrical signals having a particular frequency and having an amplitude envelope representing any difference in the positioning of said input and output members, means including damping means responsive to the movements of the output member for producing A.C. electrical signals having said particular frequency and having an amplitude envelope representing the rate at which the position of the output member is changing at any instant, means including electrical circuitry responsive to said difference signals and said rate signals for increasing the amplitudes of said difference signals relative to the amplitudes of said rate signals in a pre-selected range of frequencies of said signals and for combining said difference signals and rate signals after such relative increase to produce resultant signals, said means comprising an amplifier, a diode bridge controlled by said particular frequency to present a relatively high resistance during first one-half cycles of said particular frequency and a relatively low resistance during alternate one-half cycles of said particular frequency, a pair of diodes controlled by said particular frequency to present a relatively high resistance during first one-half cycles of said particular frequency and a relatively low resistance during alternate one-half cycles of said particular frequency, a capacitor connected to and charged by said difference signals producing means through said first diode bridge and connected to and discharging into said amplifier through said pair of diodes and a servo motor responsive to said resultant signals for varying the positioning of said output member in the direction which minimizes said resultant signals.

9. In combination in a servo system, an input member movable to different positions to represent a particular quantity, an output member movable to different positions, means including electrical circuitry responsive to the input and output members for producing error signals representing any difference in the positioning of the input and output members, means including damping means coupled to the output member for producing signals representing the rate at which the position of the output member is changing at any instant, means including electrical circuitry responsive to the error signals and the rate signals for increasing the effect of the error signals relative to the effect of the rate signals and for combining the rate signals and the error signals of relatively increased effectiveness to produce resultant signals, and means including a motor responsive to the resultant signals for changing the position of the output member in accordance with the control signals to obtain conformance of the positioning of the output member with the input member.

10. In combination in a servo system, an input member movable to different positions to represent a particular quantity, an output member movable to different positions, means including transducing means responsive to the input and output members for producing error signals representing any difference in the positioning of the input and output members, means including damping means responsive to the movements of the output member for producing signals representing such movements, means responsive to the signals from the error and damping means for controlling the amplitudes of the damping signals relative to the amplitudes of the error signals and for combining the controlled characteristics of the error and damping signals after such relative control to produce resultant signals, and means including motive means responsive to the resultant signals for varying the positioning of the output member in a direction to minimize the resultant signals.

11. In a servo system for controlling the operation of an output member in accordance with the operation of an input member, means for providing an alternating error signal having an amplitude representing the error and having a particular frequency, means coupled to the output member for producing a signal representing the speed of the output member at any instant, activating means operative at a frequency corresponding to the frequency of the error signal, means activated by the activating means in particular half cycles and coupled to the speed responsive means for varying the effect of the signals of low frequency from the speed responsive means relative to the signals of high frequency from the speed responsive means upon activation, means activated by the activating means in particular half cycles and coupled to the last mentioned means during activation for producing an alternating signal having a frequency corresponding to that of the error signal and having amplitude characteristics dependent upon the characteristics of the signal produced by the last mentioned means, and means coupled to the last mentioned means and to the error signal means, for introducing the alternating signals from the last mentioned means to the error signal means to obtain a resultant signal from the error signal means for controlling the operation of the output member.

12. In a servo system for controlling the operation of an output member in accordance with the operation of an input member, means for providing an error signal having an amplitude and phase representative of the error and having a particular frequency, control means operative at the frequency of the error signals for providing a distinction between first alternate half cycles and the other alternate half cycles, motive means coupled to the output member for providing signals representing the movements of the output member at any instant, means including a capacitance coupled to the motive means and responsive to the control means for producing a charge in the first alternate half cycles in accordance with the indications provided by the motive means, means coupled to the capacitance and responsive to the control means in particular alternate half cycles for producing alternating signals having a frequency corresponding to the error signal and having an amplitude related to the charge in the capacitance at any instant, and means coupled to the last mentioned means and to the error signal means for introducing the signal from the last mentioned means to the error signal means to obtain from the error signal means a resultant signal for controlling the operation of the output member.

13. In a servo system for controlling the operation of an output member in accordance with the operation of an input member, means for providing a signal representing an error and having alternating characteristics and having an amplitude and a phase indicative of the error, integrating means, motive means coupled to the output member for providing signal indications having characteristics related to the speed of the motive means at any instant, activating means operative in particular half cycles to couple the integrating means to the motive means for the production in the integrating means of a demodulating potential related to the integral of the speed of the output member at any instant, remodulating means responsive to the activating means to become coupled to the integrating means in particular half cycles for the production in the remodulating means of an alternating signal having characteristics related to the integral of the speed of the motive means at any instant, the remodulating means being coupled to the error signal means for controlling the operation of the error signal means in accordance with the characteristics of the remodulated alternating signal to obtain from the error signal means a resultant signal for controlling the operation of the output member.

14. In a servo system for controlling the operation of an output member in accordance with the operation of an input member, means for providing an error signal, means coupled to the output member for providing a signal representing the movements of the member, means coupled to the motive means for converting the signals representing the movements of the motive means into a proportionate direct signal representing the integral of the movements of the motive means, means coupled to the integrating means for converting the direct signal into a proportionate alternating voltage, and means coupled to the last mentioned means and to the error signal means for introducing the proportionate alternating voltage to the error signal means to obtain from the error signal means a resultant signal for controlling the operation of the servo system.

15. In a servo system for controlling the operation of an output member in accordance with the operation of an input member, means for providing signals representing an error and recurring at a particular frequency and having an amplitude and phase representative of the error, motive means coupled to the output member for providing signals having characteristics representing the speed of the output member, switching means operative at the frequency of the error signals to provide first and second states of operation, means including a capacitance operatively controlled by the switching means and coupled to the motive means upon a particular state of operation of the switching means for producing a charging of the capacitance in accordance with the characteristics of the error signal, and means including an impedance member coupled to the capacitance in a particular state of operation of the switching means for obtaining a discharge of the capacitance through the impedance member for the production across the impedance member of an alternating signal having an amplitude proportionate to the charge in the capacitance at any instant, the error signal means being responsive to the alternating signal across the impedance member for producing a resultant signal for introduction to the output member to control the operation of the member.

16. In a servo system for controlling the operation of an output member in accordance with the operation of an input member, motive means coupled to the output member for providing signals having a particular frequency and having an amplitude representing the movements of the output member at any instant, means including integrating means coupled to the motive means for integrating the signals from the motive means in particular alternate half cycles of the particular frequency and for converting the integrated signals into alternate signals having the particular frequency and having characteristics related to the integrated signals, and for providing such conversion in particular alternate half cycles, and means coupled to the last mentioned means and to the motive means for combining the signals from the motive means in each half cycle and the converted signals from the last mentioned means in the particular alternate half cycles to obtain resultant signals for controlling the operation of the output member.

17. In a servo system for controlling the operation of an output member in accordance with the operation of an input member, means including a rate generator coupled to the output member for producing signals having characteristics representing the rate at which the position of the output member is changing at any instant and having a particular frequency, activating means operative at the particular frequency, means including a capacitance coupled to the activating means and to the rate generator for producing a charge in the capacitance in alternate half cycles of the activating means and in accordance with the signals produced by the rate generator, means coupled to the activating means and to the capacitance for producing in alternate half cycles of the activating means a signal having an amplitude related to the charge in the capacitance and having the particular frequency, and means coupled to the last mentioned means and to the rate generator for mixing the signals from the rate generator and the last mentioned means in a particular ratio to obtain resultant signals for controlling the operation of the output member.

18. In a servo system for controlling the operation of an output member in accordance with the operation of an input member, means for providing a signal representing an error and having alternating characteristics and having an amplitude and a phase indicative of the error, demodulating means coupled to the error signal means in particular alternate half cycles of the alternating error signal to produce a signal representing an integral of the error, remodulating means coupled to the demodulating means in particular half cycles of the alternating error signals to produce an alternating signal at the same frequency as the error signal and having amplitude characteristics dependent upon the integral of the error at any instant, and means coupled to the remodulating means and to the error signal means for mixing the error signal and the remodulated signal in a particular relationship to obtain a resultant signal for controlling the operation of the output member.

19. In a servo system for controlling the operation of an output member in accordance with the operation of an input member, a rate generator responsive to the movements of the output member for producing a signal having an amplitude related to the movements of the output member and having a particular frequency, control means operative at the frequency of the signal from the rate generator for providing a distinction between successive half cycles of the signal from the rate generator, means including a capacitance coupled to the rate generator and responsive to the control means for producing a charge in the capacitance in particular alternate half cycles in accordance with the characteristics of the signal from the rate generator, means coupled to the capacitance and responsive to the control means in particular alternate half cycles for producing an alternating signal having a frequency corresponding to that of the signal from the rate generator and having an amplitude related to the charge in the capacitance at any instant, and means coupled to the last mentioned means and to the rate generator for mixing the signals from the rate generator and from the last mentioned means in a particular proportionate relationship to obtain a resultant signal for controlling the operation of the output member.

20. In a servo system for controlling the operation of an output member, generating means coupled to the output member for providing signals at a particular frequency and with an amplitude related to the movements of the output member at each instant, means coupled to the generating means for converting the signal from the generating means into a proportionate direct voltage, means coupled to the generating means for integrating the direct voltage, means coupled to the integrating means for converting the integrated direct voltage into a proportionate alternating signal, and means coupled to the generating means and to the last mentioned converting means for mixing a particular portion of the signal from the generating means with the alternating signal from the last mentioned converting means to obtain a resultant signal for controlling the operation of the output member.

21. A servo mechanism comprising a servomotor, an A.C. rate-responsive generator driven by said motor and excited at a particular frequency, a feedback circuit between said generator and said motor to obtain the introduction to the motor of control signals in accordance with the operation of the rate generator, and means disposed in said feedback circuit for inhibiting the introduction to the motor from the rate generator of control signals having relatively low frequencies, said inhibiting means including a chopper operative at the particular frequency, a capacitance connected in a circuit with the chopper to obtain a charge of the capacitance in particular alternate half cycles and a discharge of the capacitance in particular alternate half cycles.

22. A servo mechanism comprising a servomotor, an A.C. rate-responsive generator driven by said motor and excited at a particular frequency, a feedback circuit between said generator and said motor to obtain the introduction to the motor of control signals in accordance with the operation of the rate generator, and means disposed in said feedback circuit for inhibiting the introduction to the motor from the rate generator of control signals having relatively low frequencies, said inhibiting means including a capacitor and switching means connected in an electrical circuit with the capacitor to obtain a charge of the capacitor and particular alternate half cycles of the particular frequency and to obtain a discharge of the capacitor and particular alternate half cycles of the particular frequency.

23. A servo mechanism comprising a servomotor, an A.C. rate-responsive generator driven by said motor and excited at a particular frequency, a feedback circuit between said generator and said motor to obtain the introduction to the motor of control signals in accordance with the operation of the rate generator, and means disposed in said feedback circuit for inhibiting the introduction to the motor from the rate generator of control signals having relatively low frequencies, said inhibiting means including a capacitor and a bridge formed from a plurality of unidirectional means and connected in a circuit with the capacitor to obtain a charging of the capacitor in particular alternate half cycles and a discharge of the capacitor in particular alternate half cycles.

References Cited in the file of this patent

UNITED STATES PATENTS 2,115,086   Riggs _________________ Apr. 16, 1938
2,446,567   White et al. ____________ Aug. 10, 1948
2,632,872   Warsher _______________ Mar. 24, 1953

OTHER REFERENCES

Ahrendt, W. R.: Servomechanism Practice, McGraw-Hill, New York, N.Y., 1954, pp. 118–120 and p. 117, Fig. 8–3.

Cage, J. M., and Bashe, C. J.: Theory and Application of Industrial Electronics, McGraw-Hill, New York, 1951, pages 91 and 92.